May 19, 1959     C. F. MENCOTTI     2,887,562
WELDING TORCH ATTACHMENT
Filed Nov. 25, 1957
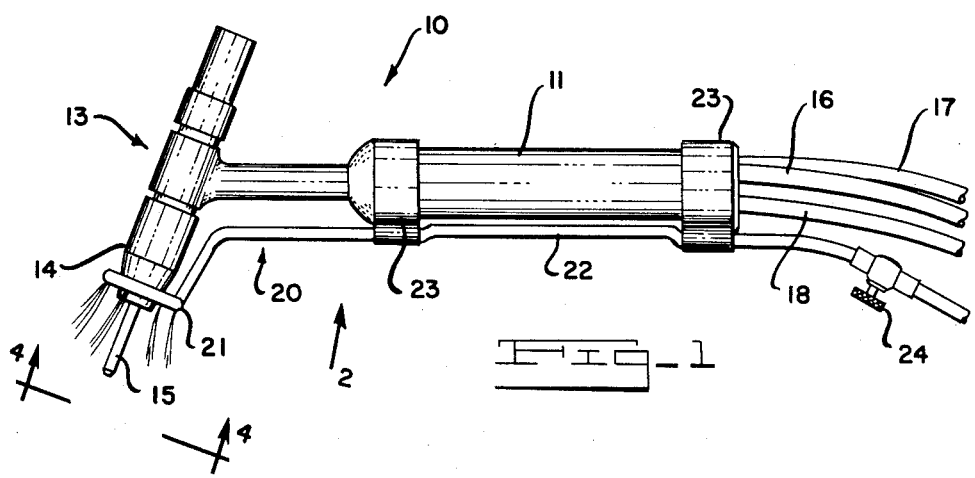
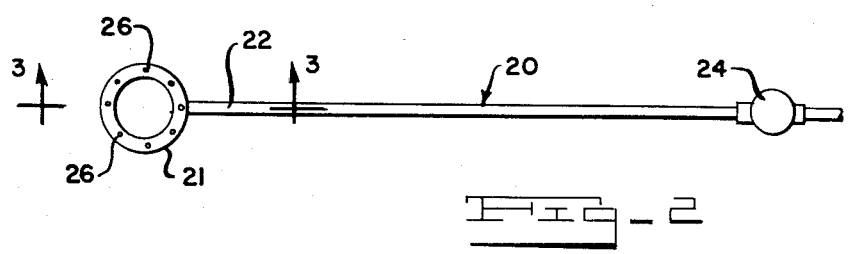
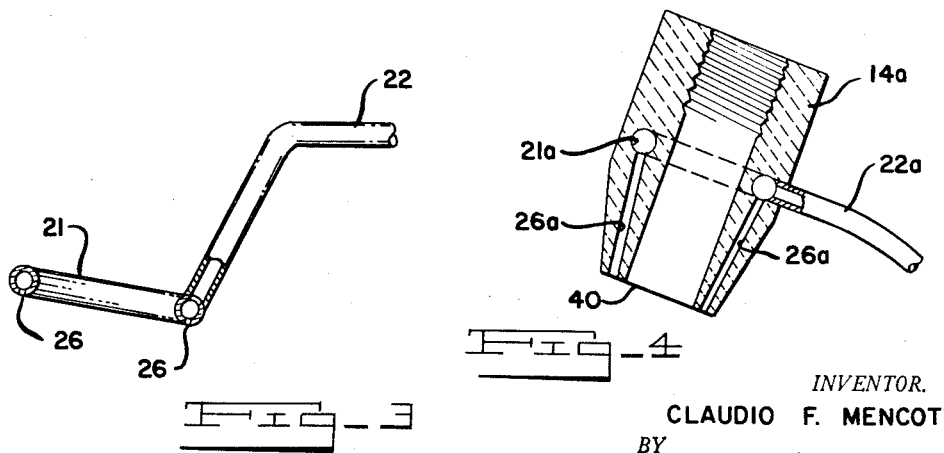
*INVENTOR.*
CLAUDIO F. MENCOTTI
BY Cullen & Cantor
ATTORNEYS

United States Patent Office 2,887,562
Patented May 19, 1959

2,887,562

WELDING TORCH ATTACHMENT

Claudio F. Mencotti, Detroit, Mich.

Application November 25, 1957, Serial No. 698,645

1 Claim. (Cl. 219—75)

This invention relates to a welding torch attachment and more particularly to an attachment formed for use with welding torches of the type disclosed in the patent to Herbst, No. 2,468,805, issued May 3, 1949, and in the patent to Pilia, No. 2,468,806, issued May 3, 1949.

Torches of this character are provided with an electrode or rod for forming an arc and may be provided with passages within the torch head for conveying an inert gas which surrounds the arc. Frequently, the welded beads formed with such torches have a great deal of surface scale and are also porous. Thus, these beads are weakened and, moreover, a second bead cannot be placed over the first bead unless the first bead is first ground and polished. In addition, these torches are inadequate to properly weld certain types of hard steels and particularly titanium carrying alloy steels.

Thus, it is an object of this invention to provide a field of hydrogen around the rod and arc of an arc type welding torch without interfering with the arc or the inert gas, where used. The use of such a hydrogen field results in a welded bead which has a smooth, clean outer surface and is free of scale. Further, the torch may then be used to weld various hard types of steels, such as titanium alloy types, which normally could not otherwise be properly welded.

A further object of this invention is to form a simple attachment which may be easily secured to or removed from the conventional arc type welding torch to provide a field of hydrogen around the rod and arc, and which in essence consists of a hollow ring attached to the head of the torch, and encircling the rod. Hydrogen is piped into this ring and a sufficient number of perforations are formed in the ring so as to direct the gas out of the ring into a constant stream flowing around the rod to completely encircle the rod and the small area of the workpiece, which is then being heated by the rod, with a field of hydrogen.

These and other objects of this invention will become apparent upon reading the following description of which the attached drawings form a part.

With reference to the drawings, in which:

Fig. 1 is a side view of a welding torch and illustrates the attachment secured to the torch.

Fig. 2 is a view of the attachment, per se, taken in the direction of arrow 2 on Fig. 1.

Fig. 3 is an enlarged view, partially in cross-section, taken in the direction of arrows 3—3 of Fig. 2.

Fig. 4 is a cross-sectional view of a modified form of the attachment wherein the attachment is formed integral with the ceramic nozzle of the torch.

THE WELDING TORCH

The welding torch disclosed herein forms no part of this invention but is described by way of illustration. The drawings illustrate a welding torch such as is disclosed in the above mentioned patents.

The welding torch 10 generally consists of a hollow, tubular handle 11 having a hollow, tubular neck 12 formed on one end thereof. A head portion 13 is connected to the neck. The construction of the head 13 may be similar to those disclosed in said patents and, thus, is omitted herein. However, it is to be noted that a nozzle 14, in the form of a tube which is more or less cylindrical in shape, and is formed of a ceramic material is threadedly attached (not shown) to the bottom of the head. The welding electrode or rod 15 extends outwardly through the nozzle. The rod is normally held in the head by means of a holding collet (not shown) and may be extended outwardly of the nozzle any desired distance.

A supply tube 16 carries coolant water and also electricity into the head 13 and the water is circulated through the head and then leaves through tube 17. A third tube 18 carries an inert gas, such as argon, into the head, with the gas being released within the head for pouring out through the nozzle to surround the rod 15 and the arc.

As mentioned, the specific construction of the welding torch is not particularly important to the attachment upon which the invention is based. However, the particular torch described above is one convenient way of showing the attachment and the operation of the attachment.

The attachment

The attachment 20 generally consists of a ring 21 which is hollow and may be formed of a hollow tube bent into a ring shape. A feed tube 22 connects with the ring 21 and hydrogen is fed through this feed tube 22 and then into the ring 21. The attachment may be secured to the welding torch by means of adhesive tape 23 or a suitable metal or plastic collar which holds the tube 22 to the handle or other parts of the welding torch.

Note, a throttle valve 24 of any conventional type is provided in the tube 22 in order to control the flow of gas through the tube or to stop the flow altogether.

The ring 21 is provided with numerous openings 26 spaced around its circumference, with the openings facing in the same direction as does the welding rod 15, and communicating into the hollow interior of the ring 21.

In operation, the torch is used to weld in the conventional manner, by striking an arc and by holding the rod 15 near the workpiece to be welded. During this time, cooling water is circulated in through tube 16 and out through tube 17, and also an inert gas enters through tube 18 and exits through nozzle 14 to create a gaseous field around the rod 15.

In addition, hydrogen is fed through the tube 22 at low pressure, such as one-half pound pressure, although the pressure is not particularly critical, and this hydrogen is directed out through the openings 26 of the hollow ring 21 to form a field which surrounds the extending end or tip of rod 15 and that small part of the workpiece which is then being welded.

With the hydrogen forming a gaseous screen around the rod and around the arc and also around the small area of the workpiece then being welded, the workpiece is heated up almost instantaneously to the proper welding temperature and the bead which is formed is completely smooth on the outside without pits or holes and without scale. It is to be noted, that in the absence of the use of this attachment, the time for heating up the metal workpiece is many times greater than the almost instantaneous heating obtained by the use of the attachment with the hydrogen gaseous field.

Also, with the use of this attachment, the inert gas requirement is substantially reduced so that only about 50 to 70% of the usual requirement of inert gas is needed to properly weld.

Modification

It is also contemplated to form the attachment ring integral with the nozzle, which then functions both as a ring and as a nozzle and replaces the ceramic nozzle 14. Thus, in Fig. 4, the nozzle 14a is provided with a ring shaped passageway 21a which is continuous within the wall of the nozzle. Openings 26a extend from the passageway 21a to the lower or discharge end 40 of the nozzle. A gas feed tube 22a connects into the passageway 21a. With this form of attachment, the ordinary nozzle 14 is removed and the nozzle 21a is substituted for it. Otherwise, the operation is the same as that described above.

This invention may be further developed within the scope of the following attached claim. Accordingly, it is desired that the foregoing description be read as being merely illustrative of an operative embodiment of this invention and not in a limiting sense.

I claim:

A welding torch attachment for use with an electrical welding torch of the type having an elongated head within which a welding rod is mounted, with the rod extending out of one end of the head, and an elongated handle connected with and extending transversely away from the head, comprising a circular closed ring formed of a small diameter, hollow tube, the inside diameter across the ring being of a size so that the ring may surround and closely fit around the head end from which the welding rod extends closely adjacent to the rod, the ring having a plurality of small openings, substantially equally spaced apart, formed therein with the openings being substantially axially aligned with the axis of the ring and extending from the rod side of the ring to the hollow interior of the ring; a feeder tube formed of thin, hollow tube and having one end thereof rigidly connected to the ring and communicating with the hollow interior of the ring, the feeder tube being arranged so that it may extend along the side of the head, but spaced from the head, and being bent to be alongside of and contiguous to the handle, and means for securing the feeder tube to the handle, and means on the opposite end of the tube for connecting the tube to a source of pressurized gas, so that gas may be fed through the feeder tube to the ring and out of the ring openings under pressure to form a substantially cylindrically shaped cloud of gas around the rod with the gas travelling in the direction of the rod.

References Cited in the file of this patent

UNITED STATES PATENTS

| 1,746,203 | Thomson et al. | Feb. 4, 1930 |
| 2,522,482 | Olzah | Sept. 12, 1950 |
| 2,686,860 | Buck et al. | Aug. 17, 1954 |

FOREIGN PATENTS

| 495,299 | Great Britain | Nov. 10, 1938 |
| 1,115,853 | France | June 16, 1956 |